Figure 1:
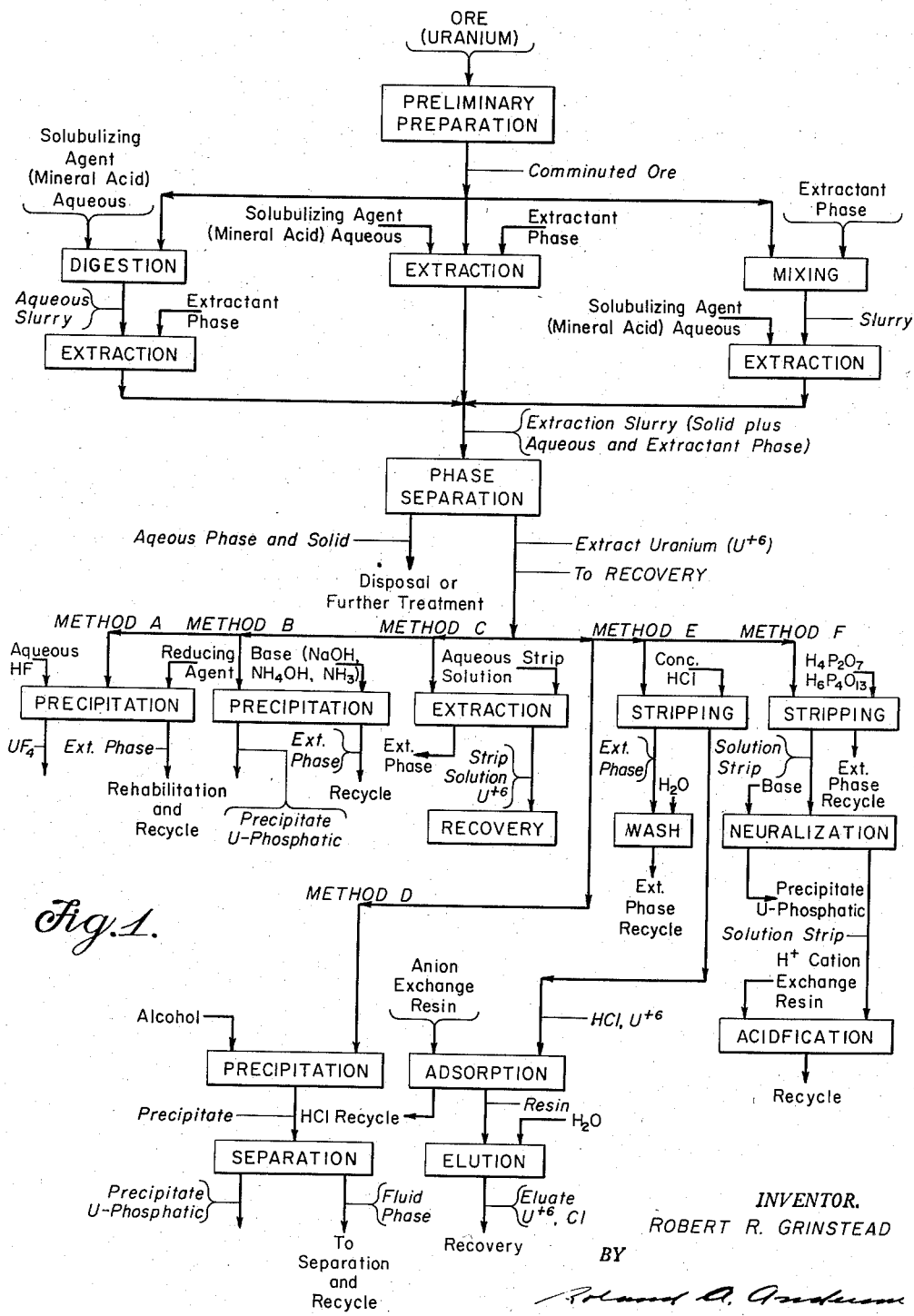

Jan. 20, 1959

R. R. GRINSTEAD 2,869,979

SLURRY SOLVENT EXTRACTION PROCESS FOR THE RECOVERY
OF METALS FROM SOLID MATERIALS

Filed Aug. 9, 1955

3 Sheets-Sheet 1

INVENTOR.
ROBERT R. GRINSTEAD
BY
ATTORNEY.

United States Patent Office 2,869,979
Patented Jan. 20, 1959

2,869,979

SLURRY SOLVENT EXTRACTION PROCESS FOR THE RECOVERY OF METALS FROM SOLID MATERIALS

Robert R. Grinstead, Concord, Calif., assignor, by mesne assignments, to the United States of America as represented by the United States Atomic Energy Commission Application August 9, 1955, Serial No. 527,428

27 Claims. (Cl. 23—14.5)

The present invention relates to solvent extraction processes for recovering metals and, more particularly, to the recovery of metals utilizing a solvent extractant phase in slurried admixture with a solid source material in the presence of an aqueous phase.

The recovery of uranium and a large number of other important and strategic metals from low-grade domestic sources usually involves the leaching of the ores with various solvents such as acids, carbonate solutions, etc., coupled with subsequent treatment of the leach solution for the separation and recovery of the desired metals. There is disclosed in the copending application of Richard H. Bailes and Ray S. Long, Serial No. 335,276, filed February 3, 1953, a solvent extraction process, utilizing alkyl phosphates, alkyl phosphites and alkyl phosphonates in admixture with an organic solvent-diluent to effect recovery of metal values from a variety of such solutions. Moreover, there are disclosed in the copending application of Ray S. Long, Serial No. 491,798 filed March 2, 1955, improved solvent extractants comprising alkyl pyrophosphates employed in somewhat similar solvent extraction processes for effecting similar purposes.

Generally speaking, these prior processes involve operations such as mechanical and preliminary preparations of the ore or other solid material, leaching and separation of the leach solution from the ore or otherwise obtaining a solution of the metal value, optional preliminary conditioning of the leach solution and then solvent extraction of the desired materials from the solution followed by recovery of the desired materials from the extract. These processes have been found very useful in the recovery and purification of metal values from aqueous solutions derived from a wide variety of source materials.

Now I have discovered that alkyl phosphatic extractants of the nature disclosed in the aforesaid copending applications may be employed to directly extract uranium and other metal values from aqueous slurried admixtures of ores or other solid materials following appropriate prior treatment. The extractant, i. e., the organic extractant phase, is directly contacted with the solid source materials in the presence of an aqueous phase forming slurried admixtures, whereby the desired metal value is effectively leached by the aqueous phase and the metal value is simultaneously extracted therefrom by the extractant phase. Several modifications of the slurry extraction operation may be used since the order of addition of the aqueous and organic extractant phases is not particularly critical insofar as extraction is concerned. Most generally, the aqueous phase which contains certain solubilizing reagents, as disclosed hereinafter, is contacted with pulverized solid material and digested therewith forming an aqueous slurry prior to contact with the organic extractant phase or both phases may be added simultaneously. Although the extractant phase can be added first, this is not usually as economical since a much larger inventory of extractant phase is required with such a procedure. Following extraction, the organic extract phase is separated from the aqueous slurry and the metal value recovered from the extract. Difficult filtration operations normally required to separate aqueous leach liquors from the slurries, as in conventional practice, are thereby eliminated and other advantages are obtained. The extraction procedures of the present invention are conducted under aqueous or semi-aqueous conditions, i. e., a distinguishable aqueous phase is always present in the slurry system as contrasted with the conditions employed in the improved non-aqueous direct solvent slurry leaching procedure disclosed in the application Serial No. 527,429 of Robert R. Grinstead, entitled "Process for the Recovery of Metals From High-Lime Carnotite Ores," being filed concurrently herewith.

It is therefore an object of the invention to provide a solvent extraction process for the separation and recovery of metallic values in which a solvent extractant phase is contacted directly in slurried admixture with a solid material under aqueous conditions to leach the metal values therefrom.

Another object of the invention is to provide a solvent extractant process for recovering metal values wherein the solid ore material is subjected to preliminary conditioning with aqueous reagents forming a slurry and an extractant phase is then contacted with the slurry to extract the desired metal therefrom.

A still further object of the invention is to provide a solvent extractant process wherein an extractant phase comprising a diluent and an organic phosphatic extractant is employed to extract metal values from a solid material slurried therewith in the presence of aqueous conditioning agents.

Another object of the invention is to provide a solvent extraction process for the separation and recovery of metallic values in which the solvent extractant phase in admixture with aqueous reagents is contacted with finely-divided solid material forming a slurry whereby the metal values are extracted into said phase and the extract phase is then separated from the mixture.

Still another object of the invention is to provide a process in which a solvent extractant phase comprising a material selected from the group consisting of alkyl phosphates, alkyl pyrophosphates, alkyl phosphites and alkyl phosphonates together with an organic diluent is contacted with a finely-divided solid material in the presence of an aqueous phase to extract the metal value therefrom and the metal value is later recovered from the extract.

Figure 2:
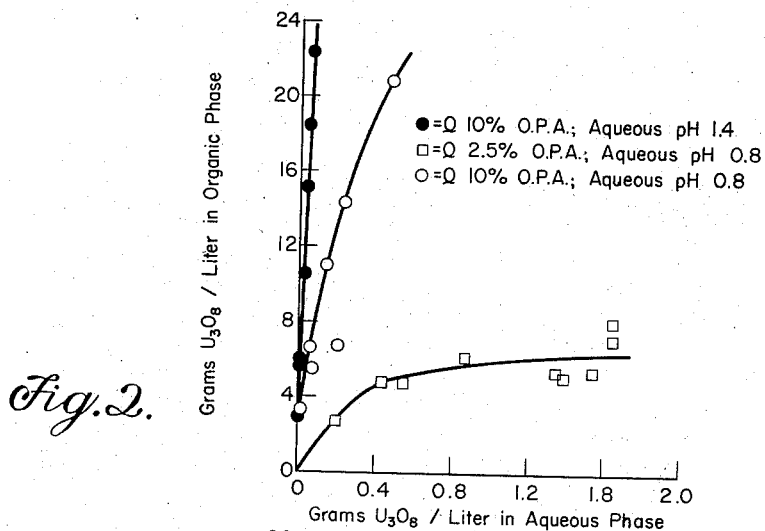
Figure 4:
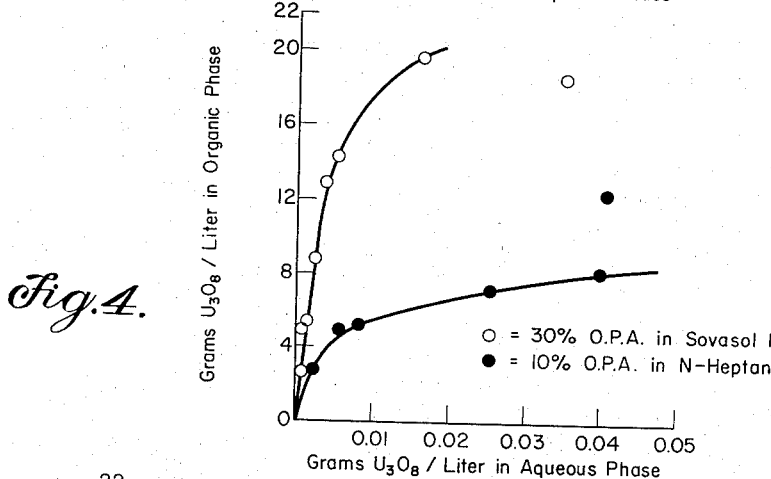
Figure 3:
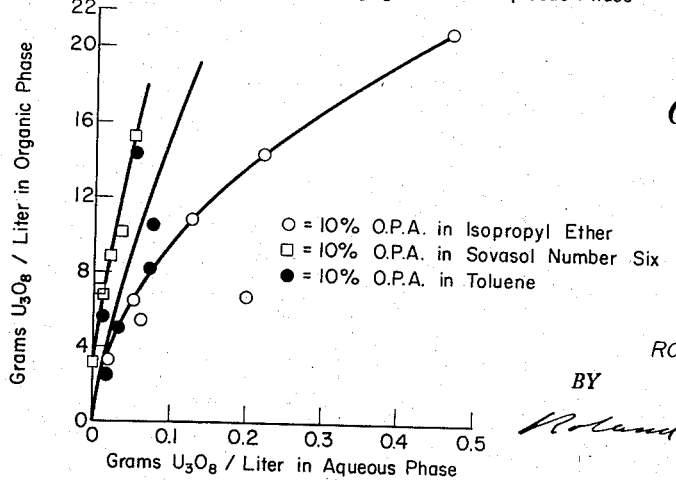
Figure 5:
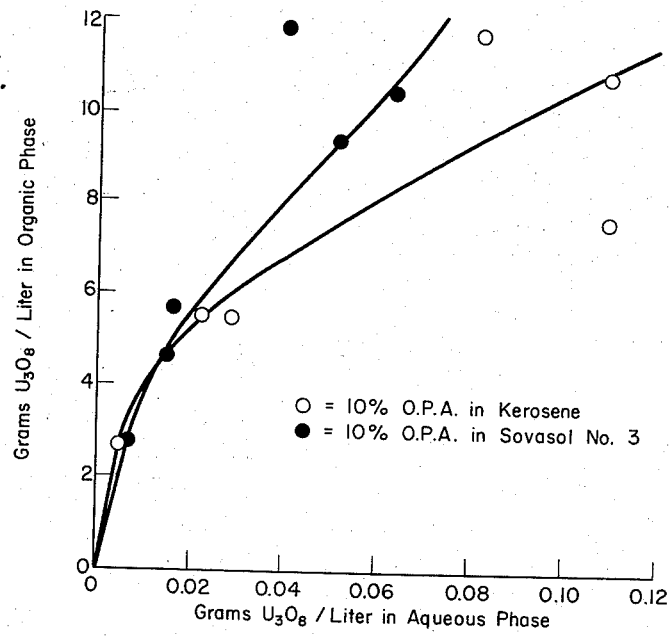
Figure 6:
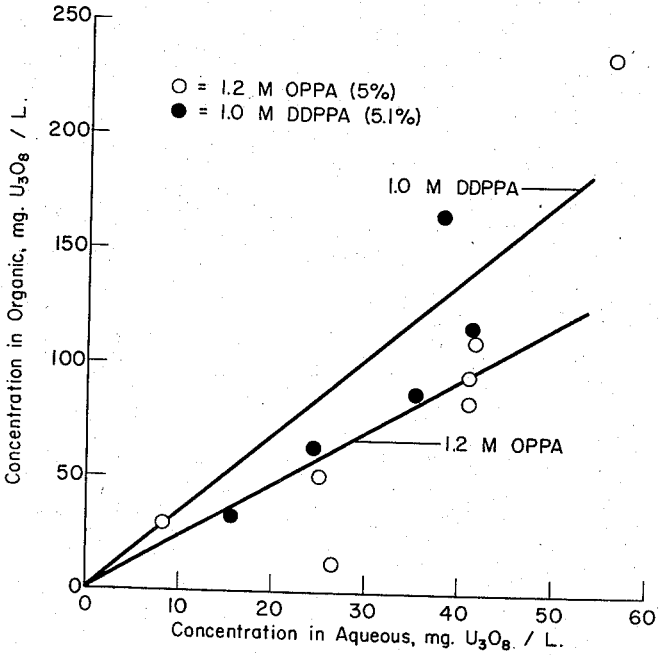

Other objects and advantages of the invention will become apparent by consideration of the following description taken in conjunction with the accompanying drawing, of which:

Figure 1 is a flow sheet illustrating the process of the invention;

Figure 2 is a graphical illustration of isotherms obtained for the distribution of uranium between various leach filtrates and O. P. A. in isopropyl ether extractant phases;

Figure 3 is a graphical illustration of isotherms obtained for the distribution of uranium between a normal leach filtrate and O. P. A. extractants in various solvents;

Figure 4 is a graphical representation of isotherms for the distribution of uranium between a normal leach solution and various O. P. A. extractant phases;

Figure 5 is a graphical representation of isotherms obtained for the distribution of uranium between O. P. A. extractant phases and normal acidic leach filtrates;

Figure 6 is a graphical illustration of isotherms for the distribution of uranium between extractant phases and nitric acid slurries of phosphate rock.

The process of the invention is generally useful for recovering uranium from low grade uranium ores or other solid uraniferous material, e. g., carnotite, shales, industrial residues remaining from the recovery of other metals and many similar materials. The process is especially valuable for recovering uranium from carnotite ores including high-lime carnotite ores since difficult filtration operations are thereby eliminated. Similar advantages will be obtained with other uranium ores and with other solid source materials. The source materials suitable for treatment in the present process may contain uranium in large proportions or in amounts of as low as about 0.01% together with a very complex mixture of impurities of a character which will be more fully disclosed hereinafter.

In general, the solid material is pulverized, if it is not in such a form, to the degree necessary to assure adequate contact with the conditioning reagents and extractant phase. The degree of comminution will vary from substance to substance since the uranium values in the ore will be deposited in various forms and the character of the base material will also exhibit various behaviors on extraction. Under certain conditions and with certain ores preliminary roasting or other treatment may be found to facilitate recovery of the desired values.

For purposes of illustration, reference will be made to the treatment of a high-lime content carnotite ore such as that which occurs in the Lukachukai district of the Colorado Plateau. In view of the complexity of this ore, the behavior of many other substances will become apparent as the description proceeds and therefore the applicability of the process to other materials will be apparent to those skilled in the art. A representative analysis of such an ore, follows:

| Constituent: | Percent by wt. |
| --- | --- |
| $U_3O_8$ | 0.41 |
| $V_2O_5$ | 1.10 |
| $Fe_2O_3$ | 1.66 |
| $Al_2O_3$ | 4.2 |
| CaO | 7.30 |
| $SiO_2$ | 75.3 |
| $P_2O_5$ | 0.04 |
| $SO_3$ | not detected |
| $TiO_2$ | 0.18 |
| MgO | 0.92 |

With reference to the flow sheet of Fig. 1 of the drawing, such a solid material, in the proper comminuted form is contacted with the extractant phase in the presence of an aqueous phase to dissolve the desired metal value. In accordance with one method of operation, as indicated above, the ore is first treated (digested) with aqueous solubilizing agents so as to yield an aqueous slurry, the slurry is then contacted with an organic extractant phase comprising an organic phosphatic compound and an organic diluent-solvent and the extractant phase is later separated from the slurry. In a second method the finely divided solid material is simultaneously contacted with the extractant phase comprising an organic phosphatic compound and a diluent-solvent and an aqueous solubilizing agent which forms an aqueous or semi-aqueous slurry therewith. The solubilizing agent may also be added subsequent to the extractant phase as noted above.

With a carnotite ore of the character described, as well as with other solid materials, the aqueous solubilizing agent will usually comprise aqueous solutions of mineral acids, of which acids, sulfuric acid, has been found especially useful and is accordingly preferred. Nitric and hydrochloric acids, either alone or in admixture with sulfuric acid, may also be employed. Sufficient acid is generally required to at least neutralize the basic constituents of the ore, yielding, with the addition of water if necessary, an acidic or neutral aqueous slurry. The use of oxidizing and reducing agents may in certain instances be found useful for solubilizing particular metal values and/or providing proper valence states to facilitate extraction as will be apparent from certain considerations noted hereinafter.

The extractant phase will generally include a diluent or solvent and as an essential component there must always be present an alkyl phosphatic extractant of the classes including alkyl orthophosphoric acids, alkyl pyrophosphoric acids, alkyl phosphites and alkyl phosphonates such as those disclosed in the aforementioned copending applications. In general, the aliphatic alkyl derivatives of the indicated phosphatic acids have been found satisfactory; however, cyclo-alkyl and aromatic alcohol derivatives may be useful particularly to obtain desired solubility characteristics. Various factors govern the choice of the particular alkyl phosphatic extractant which is to be used. In practical processes, fluidity, tendency to form emulsions, stability, ease of preparation and other properties must be taken into account. The prime factor of importance, of course, is the ability of the extractant to extract the desired metal into the organic phase. In practice alkyl derivatives of either o-phosphoric and pyrophosphoric acids, wherein the alkyl substituents are of a chain length between 4 to 10 and 4 to 17 carbon atoms in length, respectively, i. e., butyl to decyl substituted phosphoric and butyl to hepta-decyl pyrophosphoric acids have been found especially useful for extracting uranium and other metal values from various solid materials under present conditions. Generally speaking, these classes of extractant materials recover the uranium to a very high degree while extractant loss in the slurry residue may be reduced to easily tolerated levels by procedures disclosed herein. The extractants used herein will be identified by certain recognized abbreviations, e. g., octyl phosphoric acid is abbreviated as O. P. A., octyl pyrophosphoric acid as O. P. P. A., dodecyl pyrophosphoric acid as D. D. P. P. A., etc.

An organic diluent is employed to provide a larger volume of extractant phase so as to facilitate contact of the extractant with the aqueous slurried with the solid materials and to provide other desirable operating characteristics. If the extractant is used alone in the proportions employed in the process of the invention, the viscosity would usually make contact and separation from the solid material difficult and result in large losses of the extractant. The extractant phase may be contacted with the solid material in a variety of manipulative procedures including batch extraction, countercurrent extraction including continuous operation, cascade extraction and other appropriate methods either with or without recycle of the extractant phase. Phase ratios of the order of 0.2 to 10, organic volume/aqueous volume are generally employed.

In evaluating the various reagents under different process conditions, a standardized batch procedure has been utilized so as to simplify comparison of the data. The general procedure for the first noted variation of the process includes slurried digestion of the ore with an acid or other aqueous reagent solution for a standard period of time, usually about one hour, with continuous agitation, then the pH is determined and the slurry transferred to a separatory funnel wherein extractant phase is added and the mixture shaken for about five minutes. After separation of the phases the organic phase is withdrawn from the residual slurry mixture either by decantation or filtration. Accordingly, this procedure involves a preliminary aqueous leaching or digestion of the solid material followed somewhat later by inclusion of the extractant phase proper into the slurry. In performing these operations, solids content of the aqueous phase may be varied from about 10% to above about 50% and, if required, additional solvent is employed to wash the residues to assure complete recovery of the extractant phase. It will be noted that in practical operation the solvent can be recovered as by distillation, etc., from the residue if necessary and recycled. Visual observation of phase separation characteristics and other factors indicates that some solid material usually tends to be retained at the interface; however, usually not producing serious losses in the uranium recovery. With the second variation of the process, the extractant phase proper is applied simultaneously with the aqueous leaching, digesting or other accessory reagent. The preceding procedures correspond to the operations which are employed in large scale commercial versions of the processes.

With reference to all of the process variations supra, treatment with the mineral acid results in certain extractive behaviors with variation in the amount of acid employed. High concentrations of extraction agents in the organic phase, e. g., ca. 50% or more, are capable of dissolving high proportions of the uranium since large amounts of extractant can behave as an acid. However, due to the high viscosity and other factors processing is difficult and reagent cost obviously is exorbitant with such a procedure. Therefore, appropriate amounts of aqueous mineral acid and extractant concentrations in the range of about 1 to 30% of the organic leach phase, yielding optimal overall results, are generally preferred. Concentrations lower than 1% may be employed under certain circumstances and especially with the highly effective alkyl pyrophosphatic extractants. The proportion of extractant required will be influenced by many factors such as the procedural variation, nature of the diluent, relative extraction efficiency of the alkyl phosphatic extractant (i. e., on a molar basis), amount of acid or other conditioning reagents employed, contactor conditions, condition of the ore, and other, all of which conditions are interdependent to a greater or lesser degree considered to be apparent from the disclosure.

In the present processes sufficient acid must be used to substantially satisfy the requirements of normal acid leaching processes, i. e., sufficient acid is employed to react with substantially all basically reactive material in the ore and to dissolve the desired metal value. Sulfuric acid produces exceptionally good extraction of the uranium and low extractant losses. Nitric and hydrochloric acids exhibit somewhat similar behavior in increasing the uranum extraction. In usual practice, an amount of mineral acid, in the range about equivalent to 50 to 600 lbs./ton of $H_2SO_4$ (100% basis), is required. The larger amounts of acid which may even approach 1,000 pounds per ton of ore as noted below are, of course, required with high-line carnotite ores such as those which originate in the Plateau Region or other high basicity ores. For some purposes, less or considerably more acid may be used as noted hereinafter.

Preliminary digestive acid treatment of the solid material as practiced in the first variation of the process may require about 30 minutes to 1 or more hours either in the cold or with heating and only a few minutes contact in the cold with the extractant phase. Equivalent or shorter times are usually required with the other procedures. Uranium appears to be more rapidly extracted during the initial period of contact and is displaced by subsequent extraction of iron in the ore. Accordingly, unduly long contact periods are to be avoided if more selective and efficient uranium recovery is desired.

In practice, certain oxygenated organic solvents characteristically yield the highest uranium recoveries when employed as diluents in the present process. These oxygenated solvents include ethers, typically represented by the lower boiling members such as methyl, ethyl, propyl, isopropyl, butyl and butyl isomers and higher ketones, e. g., methyl isobutyl ketone. Oxygenated naphthenic solvents corresponding to these materials can also yield similar results. Excellent recoveries are also obtained with petroleum solvents including fluid aliphatic hydrocarbons, kerosenes, and gasolines. Various other hydrocarbon solvents can be used, e. g., Stoddard solvent, Sovasols, paint thinners, cleaning solvents, some aromatics such as benzene, xylene and toluene. The petroleum solvents are usually preferred in large-scale operation for economic reasons. From the diverse nature of the materials indicated it will be understood that other similar materials may also be employed. While single-stage batch processes could advantageously employ the diluents which yield the higher recoveries, multistages or cascade operations operate satisfactorily with the solvents with lower extraction efficiency when other desirable process characteristics offset the low extraction obtained with a particular solvent.

From a uranium ore of the character described only the uranium and iron, presumably in the hexavalent and trivalent states, respectively, are extracted with highest efficiency. Vanadium is extracted to a considerable degree; however, in the oxidation state in which it is present in these ores only about a maximum of 10–20% of the total vanadium appears during recovery of the uranium. With especially modified processes, i. e., proper treatment of the ore, higher proportions may be obtained.

The behavior of various metal values with the extractants employed herein follows certain general rules especially when the extraction efficiencies from acidic or neutral aqueous phases are considered. While the extraction coefficients for different classes of extractants do not vary as widely in the present process as compared with the remarkable differences in liquid-liquid extractions of the character described in said copending applications, the extractability of particular metal values as related to oxidation state, i. e., valance state, appears to follow generally similar rules. An apparent reason may concern the formation of similar metal value-extractant compounds in either process and the similar solubility thereof in the organic phase. In practicing the invention, it has been found instructive to study systems in which the aqueous phase of the slurry is separated from the solids so as to present the simpler conditions of a liquid-liquid extraction.

In many of its aspects the present process resembles an extraction process in that an organic phase similar in composition to that obtained in liquid-liquid extraction is obtained. In such liquid-liquid extraction systems, monovalent and divalent ions, e. g., $Na^+$, $K^+$, $Ca^{++}$, $Mg^{++}$, $Fe^{++}$, etc., are not extracted to any appreciable extent. Trivalent ions such as $Fe^{+++}$, and those of the lanthanide and actinide series are usually extracted with high efficiency while tetravalent ions such as $Th^{+4}$, $U^{+4}$ and other highly charged ions of the actinide elements are extracted with the highest efficiencies and it may be noted, tetravalent vanadium is extracted with the greater efficiency is pentavalent. Dispositive oxygenated ions such as uranyl, $UO_2^{++}$, anomalously, are extracted with excellent efficiency.

Separation of the extractant phase from the slurried mixture requires only a simple decantation or filtration in the event that a rapid and complete phase separation occurs as with certain solvents, e. g., ethers. With other solvents, e. g., kerosene, particularly with high solids content and under not easily predictable conditions, phase separation may be more difficult and require especially adapted separative techniques disclosed hereinafter; however, the phase separation difficulty is much less troublesome than the filtration difficulties noted in conventional processes wherein similar phase separation problems can also occur.

Utilizing the slurry-extraction process of the invention, phase separation presents some difficulties since diluent solutions of some of the phosphatic extractants, particularly those with the higher alkyl substituents, tend to emulsify in contact with aqueous media, a situation which is intensified due to the presence of the solid phase derived, for example, from carnotite ore, in the system. The situation is easily observed by mixing a dilute $H_2SO_4$ slurry of such carnotite ore with a solution of O. P. A. in an immiscible solvent, e. g., kerosene, and then allowing the phases to separate. (HCl slurries separate more rapidly and HNO₃ slurries somewhat less rapidly than H₂SO₄ slurries.) The majority of the solid (by weight) is relatively coarse sand, and tends to settle rapidly. There is a large amount of slime, which settles very slowly, and for the most part, remains suspended as a fluffy material throughout the aqueous phase. This material prevents both the downward movement of the sand particles and the upward movement of the droplets of organic phase through the aqueous medium. The rising organic phase is visible, due to the adsorption, apparently at the surface of the droplet, of a fine dark brown solid. This solid also prevents a rapid coalescence of the droplets after they reach the interface although, once coalescence has occurred, the organic phase is observed to be a fairly clear solution. However, the rate of phase separation is quite noticeably increased by gentle agitation of the system. A simple technique has been found to greatly increase the rate of separation of the phases. The phases should be agitated quite vigorously during the extraction stages to promote contact; however, the phases separate much more rapidly when only mild agitation is applied to the aqueous phase alone.

The effect of slow phase separation is generally noted as a loss of extractant phase with attendant poor extraction efficiency as a result of organic phase entrainment in the residual solids. Considerable amounts of the entrained material including lost extractant can be recovered by procedures in which the residue is contacted one or more times with fresh solvent as in a washing process, whereby as much as 99% recovery may be obtained. An air agitation method provides considerably more efficient separation of the phases. This method may be illustrated by reference to a particular manner in which it has been employed in practice. In accord with this method the mixed phases are introduced into a relatively tall cylinder or tower and finely dispersed air bubbles are introduced at the bottom as by blowing through a glass frit. At least two effects appear to contribute to the enhanced phase separation, viz., the air bubbles appear to become attached to the entrained organic phase droplets and to transport the droplets upward, somewhat as in a flotation process and the agitation associated with the passage of the air bubbles tends to coalesce the individual droplets into larger and more easily separated drops. This procedure is assisted by the slow agitation (mechanical stirring) noted above.

More rapid separations are usually noted when utilizing ethers than when utilizing either aliphatic or aromatic hydrocarbons. The nature of the original ore and prior treatment also materially affects phase separation.

Another method, involving phase inversion, may be employed to reduce entrainment of the organic phase in the aqueous slurry residue. In accordance with this method the aqueous phase is dispersed in the organic phase, whereby a minor amount of aqueous phase may be entrained in the organic and thereby loss of the organic phase to the slurry residue is virtually eliminated. More particularly, the slurry extraction is conducted as described above and then the slurried mixture is contacted, in a finely divided form, with an additional large volume of extractant phase as by dropping the slurried mixture through an additional quantity of the extractant phase, whereupon rapid separation ensues. An extract obtained by any of the hereinbefore disclosed methods is treated for the recovery of the metal value, particularly uranium, by a variety of methods disclosed in the following:

METHOD A.—REDUCTION—PRECIPITATION WITH HF

An extract prepared as described above may be treated for the recovery of uranium by contact with an aqueous phase containing HF in the presence of a reducing agent. Powdered iron and $FeSO_4$ or $Na_2S_2O_4$ reducing agents have been found satisfactory for this purpose. Low concentrations of HF, e. g., about 3 to 5% and phase ratios of from about 5:1 to about 10:1, organic to aqueous, are sufficient to give essentially complete uranium recoveries. A more concentrated HF solution is used if emulsification becomes a problem. The organic phase may be recycled following rehabilitation and the aqueous precipitant phase recycled after separation from the precipitate. The product obtained is an impure uranium fluoride. This method may be expected to work with other lanthanide and actinide elements for which insoluble fluorides are formed, in some cases not requiring the reducing agent provided the extracted metal value is in the appropriate oxidation stage.

METHOD B.—BASIC PRECIPITATION

Uranium can be precipitated from such an extract by neutralization with basic materials. For example, O. P. A.-ether extract solutions are neutralized with excess NaOH in aqueous solution producing either a yellow precipitate or two phases with the uranium precipitated in the aqueous. Gaseous or aqueous ammonia is likewise effective in precipitating the uranium. Precipitated material is then separated from the phases and may be dried, yielding an impure uranium phosphatic material. This impure material can be calcined to yield an impure inorganic uranium phosphate or treated by known methods to yield high purity uranium compounds. Many other metal values will behave similarly.

METHOD C.—RE-EXTRACTION OF THE URANIUM WITH AQUEOUS REAGENT SOLUTIONS

Extracts prepared as described above may be contacted with various aqueous reagent solutions whereby the uranium is extracted into the aqueous solution and may be recovered therefrom. The uranium in the extracts is generally present in the hexavalent state and is extractable into aqueous solutions containing oxalic acid, HF, $Na_4P_2O_7$ or $Na_6P_4O_{13}$. Aqueous 0.5 M $H_2C_2O_4$ contacted with an O. P. A.-ether extract containing 5 grams $U_3O_8$ per liter extracted 40% of the uranium into the aqueous phase indicating that multi-stage countercurrent processes utilizing this reagent would be useful in recovering the uranium from the extract. Evaporation of the water and calcination of the residue would yield an impure uranium oxide product. Precipitation methods, e. g., with ammonia, could also be employed to recover the uranium from such an oxalic acid solution.

Aqueous HF, in about 3 to 5% concentration, extracts the uranium from such an organic extract with almost the theoretical maximum efficiency and the distribution constants of hexavalent uranium into the aqueous phase at low levels, i. e., about 1 gram $U_3O_8$ per liter in 5% O. P. A. in ether, are about 9 for 3% HF and about 30 for 5% HF. Treatment of this aqueous extract with a reducing agent such as $Na_2S_2O_4$, Fe, $FeSO_4$ or other material precipitates uranous fluoride material from the aqueous extract.

Aqueous solutions of $Na_4P_2O_7$ or $Na_6P_4O_{13}$ of about 0.5 to 3% concentration are very effective in removing the uranium from the extract. Neutralization of the inorganic aqueous pyrophosphate obtained in this manner, with base, precipitates an impure uranyl phosphatic material.

METHOD D.—PRECIPITATION WITH ALCOHOL

Methyl and ethyl alcohols added to O. P. P. A. extractant phases, particularly these prepared with hydrocarbon solvents, precipitate uranium while isopropyl and higher alcohols do not. The alcohol apparently selectively extracts excess extractant from the organic phase and the uranium-extractant compound precipitates as a third phase which is not soluble in either of the other two fluid phases and may be separated therefrom. Addition of water to the alcohol phase decreases the solubility of the extractant therein and the extractant can be extracted, e. g., with kerosene to form a new extractant phase. The alcohol can then be separated from the water by distillation and reused.

METHOD.—STRIPPING WITH CONCENTRATED HCl

The extracts obtained with o-phosphoric extractants are especially amenable to treatment with concentrated HCl to remove the uranium therefrom. HCl above about 8-10 M concentration efficiently removes the uranium from such extracts by contact as in a Scheibel column. HCl which dissolves in the extract is easily removed by water washing. Uranium dissolved in the HCl can be recovered either by neutralization with base or by contacting the HCl phase with a strongly basic anionic exchange resin such as Dowex-1 whereon the uranium is adsorbed as an anionic chloride complex and the acid can then be reused. Subsequent elution with water yields a purified uranyl chloride solution from which fairly pure uranium products may be precipitated as with ammonia. Also the HCl can be distilled for reuse leaving the uranium as an impure residue.

METHOD F.—STRIPPING WITH PYROPHOSPHORIC ACID SOLUTIONS

Acidified solutions of pyrophosphates or polyphosphates extract uranium with great efficiency from the extractant phase of the invention. Solutions obtained by acidifying solutions of either $Na_4P_2O_7$ or $Na_6P_4O_{13}$ with $H_2SO_4$ or $H_3PO_4$ are representative of this method of stripping. Solutions of the unacidified salts employed as disclosed above tend to destroy the usefulness of the extractant phase on recycle while the present method does not.

The compounds formed in the acidification of the indicated materials are the acids $H_4P_2O_7$ and $H_6P_4O_{13}$. Organic to aqueous phase ratios of the order of 20:1 to 1:2 have been found operable under various conditions. Aqueous solutions of the phosphate stripping agents which have been acidified to pH values ranging below about 1 and of various concentrations below saturation, dependent on extraction conditions, have been found superior in practice. These lower pH values tend to produce rapid hydrolysis of the reagent and therefore the reagent is to be employed within a few hours after acidification and conditions appropriately chosen to reduce the effect of hydrolysis. Fortuitously low pH values favor rapid separation of the phases.

Increases in the concentration of the alkyl phosphatic extractant in the organic extractant phase decrease the amount of uranium stripped by the acidified pyrophosphate phase; therefore, there will be optimum concentrations of such an extractant determined by consideration of extraction efficiencies required in both the slurried phase and stripping operations. Dilution of the organic extractant phase with additional solvent will assist the stripping operation.

Saturated solutions of the salts used to prepare these reagents occur at low concentrations, e. g., about 0.25 M for $Na_4P_2O_7$. Since maximum stripping occurs with the concentrated solutions of the acidic form, it is highly desirable, especially in recycle operations, to employ acidification methods which do not unnecessarily dilute or contaminate the solutions. The method of recovering the uranium involves addition of base (NaOH) until a high pH (above about 11.6) is obtained yielding a uranium precipitate. Therefore, for recycle, reacidification is necessary and the effect of repeated recycling is indicated by the following experiment. Saturated $Na_4P_2O_7$ solution was acidified to a pH of 0.6 with concentrated $H_2SO_4$. Portions were then equilibrated with a 5% O. P. A. in kerosene extract containing 5.2 g. of $U_3O_8$ per liter, at organic to aqueous phase ratios of 5 and 4, respectively. Uranium was precipitated with addition of base to obtain a pH of 11.6 and the precipitate filtered therefrom. After reacidification the above cycle was repeated several times with the same $Na_4P_2O_7$ solution and with the results indicated in the following table:

| Cycle No. | Total $PO_4$ Conc. of $H_4P_2O_7$ Solution, g./l. | Vol. of $H_4P_2O_7$ Solution, ml. | Vol. of 5% O. P. A.—Kerosene, ml. | $U_3O_8$ in Org., g./l. | $U_3O_8$ in aq., g./l. | $K\frac{A}{O}$ | $U_3O_8$ Recy., Percent | $U_3O_8$ Bal., Percent |
|---|---|---|---|---|---|---|---|---|
| 1 | 41.2 | 10 | 50 | 2.34 | 14.8 | 6.33 | 55 | 102 |
| 1 | 41.2 | 10 | 40 | 1.81 | 13.6 | 7.51 | 65 | 100 |
| 2 | 38.2 | 10 | 50 | 2.95 | 11.2 | 3.80 | 43 | 100 |
| 2 | 38.2 | 10 | 40 | 2.54 | 10.4 | 4.10 | 51 | 99 |
| 3 | 29.8 | 10 | 50 | 3.22 | 8.14 | 2.52 | 38 | 94 |
| 3 | 29.8 | 10 | 40 | 3.28 | 7.52 | 2.29 | 37 | 99 |
| 4 | 21.6 | 10 | 50 | 4.20 | 5.46 | 1.30 | 19 | 102 |
| 4 | 21.6 | 10 | 40 | 3.82 | 5.05 | 1.32 | 27 | 98 |

As may be noted the extraction coefficient declines fivefold, uranium recovery drops twofold coincident with a 50% decline in $Na_4P_2O_7$ concentration. With the values shown multistage treatment of the organic phase would be required for high uranium recoveries.

The above difficulty is greatly alleviated by reacidifying the neutralized $H_4P_2O_7$ solution, at least partially, by contact with an acidified cationic exchange resin such as Dowex-50, an insoluble sulphonated polystyrene polymer. In this manner, dilution and contamination of the solution with sulfate is greatly reduced.

The remarkable effectiveness of the $Na_4P_2O_7$ reagent is indicated by the fact that saturation of the aqueous phase is approached with a 1 to 1 molecular ratio of uranium to pyrophosphate often resulting in uranium concentrations as high as 40 or more grams per liter in the aqueous phase. Precipitation from the pyrophosphate may be accomplished by neutralization with sodium hydroxide in the presence of sodium bisulfite. In the absence of sodium bisulfite, with ether extract solutions, only a portion of the uranium precipitates due apparently to the formation of peroxyuranates derived from peroxide compounds contained in the ether solvent. With other solvents the sodium bisulfite is usually not necessary. Precipitation begins at about a pH of 10 and is complete as the higher pH values are approached. On filtering, washing and drying a precipitate is obtained which contains mainly uranium oxide and a small amount of phosphate.

Further details of the process of the invention will become apparent by consideration of the following examples:

Example I

A carnotite ore having the following analysis was utilized in this and subsequent examples:

Constituent: Percent by weight
$U_3O_8$ _____ 0.41
$V_2O_5$ _____ 1.10
$Fe_2O_3$ _____ 1.66
$Al_2O_3$ _____ 4.2
CaO _____ 7.30
$SiO_2$ _____ 75.3
$P_2O_5$ _____ 0.04
$SO_3$ _____ not detected
$TiO_2$ _____ 0.18
MgO _____ 0.92

Due to the high calcium content which is present mainly as calcium carbonate, this ore is classified as a high-lime ore. The particle size on grinding ranged from about 50 to 270 mesh. The acid requirements for this ore were determined by shaking the various concentrations of $H_2SO_4$, at 33% solids contents for periods of one to two days or until the pH of the slurry became constant. It was determined that below a pH of 1.4 no further uranium was leached from the ore and, accordingly, this is the lowest final pH required to release the uranium from this particular ore in a normal leaching operation. This procedure may also be employed to determine the acid requirements of any particular source material. To obtain this pH about 280 pounds of 100% $H_2SO_4$ per ton of ore was required to yield about 98% uranium extraction. With roasting, uranium recovery was reduced and vanadium extraction increased, a result for which no explanation is apparent.

Commercial octyl phosphoric acid (O. P. A.) which is about a 50:50 mole ratio mixture of mono- and dioctyl phosphoric acid was used as a 10% solution in kerosene in preliminary operations to extract a 33% solids aqueous leach slurry. It was found that the extractant phase was difficult to separate at room temperature; however, at 70 to 80° C., separation was rapid. These higher temperatures tend to destroy the extraction efficiency of the phosphatic extractant and are to be avoided in recycle operations. Accordingly, 10% solutions of O. P. A. in various solvents were utilized to extract an aqueous $H_2SO_4$ slurry of the above ore containing 17% solids and having a pH of 1.5. 100 ml. volumes of slurry and 50 ml. volumes of extractant phase were shaken vigorously for several minutes and then gently rocked mechanically with observation of the time to obtain essentially complete coalescense. Conditions and results are presented in the following table:

genated hydrocarbon solvents, being preferred for both extractive and phase separation characteristics.

*Example II*

A high acid ($H_2SO_4$) aqueous leach procedure was used to leach uranium and vanadium from such ore. The ore was heated to 110° C. for 16 to 24 hours with $H_2SO_4$ in the amount of 900 lbs./ton and the resulting material extracted for 4 hours with water. Under these conditions any iron which is present is leached along with essentially all of the uranium, vanadium and other materials. Subsequent solvent extraction of this oxidized solution with the extractants of the invention are relatively ineffective with reference to uranium or vanadium due to interference by the iron. In the absence of iron both of these materials, i. e., U as hexavalent and V as pentavalent, are both efficiently leached.

Reduction of the iron to the ferrous state by gassing the aqueous leach with $H_2S$ (or treatment with other reducing agents) followed by two batchwise contacts with 5% O. P. A. in ether yielded essentially complete extraction of the uranium. Serious interference by iron is noted when Fe is above about 2–5 g./liter of extractant phase (10% commercial O. P. A.) and acid content of the aqueous phase is high. In the pH range of 0.6 to 1.0 Fe interference is much less than at 4N $H_2SO_4$ or above.

*Example III*

A slurry made from phosphate rock by treatment with $H_2SO_4$ and $HNO_3$ and having the following composition was used in this example:

| Component: | Concentration |
|---|---|
| $U_3O_8$ | mg./liter__ 89.6 |
| $P_2O_5$ | percent__ 16.48 |
| Ca | do____ 12.9 |
| $SO_4$ | do____ 10.7 |
| $NO_3$ | do____ 31.9 |

Sp. Gr. 1.77.
Loss of weight on drying was 50%.

TABLE.—EXAMPLE I

| Solvent | Time required for Coalescence, Min. | Aqueous | | Organic | | *$K_D$ | |
|---|---|---|---|---|---|---|---|
| | | $U_3O_8$, g./l. | $V_2O_5$, g./l. | $U_3O_8$, g./l. | $V_2O_5$, g./l. | $U_3O_8$ | $V_2O_5$ |
| Diethyl ether | 2 | 0.004 | 0.16 | 8+ | | 4 500 | 4 4 |
| Diisopropyl ether | 3–4 | 0.0028 | 0.21 | 2.06 | 0.47 | 750 | 1.5 |
| Kerosene 1 | 6 | (5) | (5) | (5) | (5) | (5) | (5) |
| n-Octyl alcohol | 12 | (5) | (5) | (5) | (5) | (5) | (5) |
| Di-n-butyl ether | 16 | 0.0013 | 0.21 | 1.71 | 0.44 | 1370 | 2.1 |
| $CCl_4$ | 18 | 0.0025 | 0.10 | 1.92 | 0.88 | 760 | 8.8 |
| Hexone | 18 | 0.0055 | 0.21 | 1.76 | 0.32 | 320 | 9.0 |
| Benzene | 38 | 0.013 | 0.07 | 1.95 | 0.80 | 150 | 11.5 |
| Rubber solvent | 38 | 0.0025 | 0.11 | 2.03 | 0.86 | 800 | 7.8 |
| Kerosene 2 | 45 | 0.0013 | 0.60 | 1.92 | 1.02 | 1540 | 1.7 |
| Kerosene 3 | 60 | 0.0013 | 0.42 | 1.8 | 0.60 | 1440 | 1.2 |
| Di-n-hexyl ether | 67 | 0.0013 | 0.29 | 1.80 | 0.27 | 1500 | 2.2 |
| Hexane | 80 | 0.0025 | 0.11 | 1.8 | 1.0 | 720 | 9.0 |
| Kerosene | >2 hrs. | | | | | | |

*$K_D = \dfrac{g./l. \text{ in organic}}{g./l. \text{ in aqueous}}$
1 No. O. P. A. present.
2 Ore roasted 1 hr. at 800° C.
3 Ore roasted 4 hrs. at 400° C.
4 Estimated.
5 Incomplete analysis.

With all of the solvents the organic layer was generally clear. In the $CCl_4$ extractions, however, the particles of ore settled into the lower $CCl_4$ layer. It will be noted that all of the ethers exhibited high $K_D$ values for uranium, the value rising as the hydrocarbon chain is lengthened. On the basis of these results the ethers are preferred solvents for extractive purposes noted and with the low molecular ethers and higher alcohols, i. e., oxy- Extraction isotherms were determined using four different ratios of organic to slurry phase volumes with 10% solutions in kerosene of O. P. A., O. P. P. A. (octyl pyrophosphoric acid) and O. P. A. to which $P_2O_5$ had been added. The O. P. A. was a commercial product and the O. P. P. A. was prepared by reacting Eastman n-octyl alcohol and $P_2O_5$. Distribution coefficient results and conditions of the extractions are tabulated hereinafter.

| Extractant | Concentration in kerosene, percent | Pretreatment of slurry | K | $K_D$ |
|---|---|---|---|---|
| O. P. A. | 10 | None | 9.0 | 0.90 |
| O. P. A.+25 g. $P_2O_5$/l O. P. A. | 10 | do | 9.2 | 0.92 |
| O. P. A.+100 g. $P_2O_5$/l O. P. A. | 10 | do | 13.1 | 1.31 |
| O. P. A.+150 g. $P_2O_5$/l O. P. A. | 10 | do | 18.5 | 1.85 |
| O. P. P. A. | 1 | do | 12.8 | 0.13 |
| O. P. P. A. | 10 | Stored in glass. | 12.6 | 1.9? |
| O. P. P. A. | 10 | 4 g. Fe added/l. | 8.5 | 0.85 | fore, the di-O. P. A. is preferred as a selective extractant in the solvent extraction procedure of the invention.

*Example V*

Isopropyl ether solutions of commercial O. P. A. were employed to extract uranium from aqueous solutions containing various impurity metals. 25 ml. of 5% O. P. A. in isopropyl ether was contacted with 100 ml. of a solution containing 1 g. $UO_2SO_4$/1 liter, 20 g. of $SO_4$/liter, at a pH of 1.0, with other ions present and with the results tabulated below: As may be noted therefrom only the ferric iron is extracted or interferes with the uranium extraction to any great extent.

| Expt. No. | Other Ions Present | Equilibrium Concentrations | | | | | $K_{U_3O_8}=\frac{(U_3O_8) \text{ org.}}{(U_3O_8) \text{ aq.}}$ |
|---|---|---|---|---|---|---|---|
| | | Aqueous | | | Organic | | |
| | | Grams, $U_3O_8$/liter | Grams, Metal/liter | pH | Grams, $U_3O_8$/liter | Grams, Metal/liter | |
| 1 | None | 0.046 | | 1.0 | 3.8 | | 82 |
| 2 | $Fe^{+++}$ | 0.12 | 0.02 | 1.0 | 3.6 | 1.04 | 30 |
| 3 | $Fe^{+++}$ | 0.47 | 0.049 | 1.0 | 2.1 | [1] 3.0 | 4.5 |
| 4 | $Fe^{+++}$ | 1.03 | 2.02 | 0.8 | [2] 0.14 | 4.0 | 0.14 |
| 5 | $Fe^{+++}$ | 1.02 | 4.37 | 0.7 | <0.2 | [1] 6.5 | <0.2 |
| 6 | $Al^{+++}$ | 0.03 | 4.75 | 0.9 | 3.9 | 0.17 | 130 |
| 7 | $Al^{+++}$ | 0.05 | 0.57 | 0.9 | 3.8 | n. d. | 76 |
| 8 | $Mg^{++}$ | 0.046 | 0.6 | 0.95 | 3.8 | 0.01 | 82 |

[1] By difference.
[2] Determined directly.
n. d. = not detected.

*Example IV*

Mixtures of mono- and dioctyl phosphoric acid extractants (commercial O. P. A.) are subject to interference of uranium extraction by ferric ion. 0.1 M solutions of separated mono- and dioctyl phosphoric acids (di-O. P. A.) and 0.2 M solutions of di-O. P. A., in kerosene, were employed to extract uranium from aqueous sulfate solutions under various conditions. The aqueous phase included 1.1 g. of Fe/liter, 20 gr. of $SO_4$/liter; and had a pH of 1.0. Other conditions and the results are tabulated below:

*Example VI*

A somewhat standardized procedure was used to prepare aqueous slurries of the above carnotite ore comprising digestion with 280 lbs. $H_2SO_4$/ton of ore, diluted to 30% solids with water, for a period of one hour. Extraction was accomplished in beakers by vigorously stirred contact of 5% O. P. A., in various solvents, for 5 minutes and then an improved method of encouraging phase separation was discovered and used herein. This method merely requires a period of gentle stirring or other gentle agitation, e. g., as with the stirrer inserted in the lower aqueous phase. With this procedure, using 30 g. of ore, in a 30% slurry, with 5%

| Expt. No. | Phase Ratio [1] | Extractant | | Equilibrium Concs. | | | $K_D=\frac{(Fe) \text{ Org.}}{(Fe) \text{ Aq.}}$ |
|---|---|---|---|---|---|---|---|
| | | Species | Conc. M | Aqueous | | Organic, g. Fe/liter | |
| | | | | g. Fe/liter | pH | | |
| 1 | 0.5 | Mono- | 0.1 | 0.011 | 1.0 | 2.2 | 200 |
| 2 | 1.0 | Mono- | 0.1 | 0.001 | 0.9 | 1.1 | 1,100 |
| 3 | 2.0 | Mono- | 0.1 | 0.001 | 0.0 | 0.55 | 550 |
| 4 | 0.5 | Di- | 0.1 | 0.43 | 1.0 | 1.34 | 3.1 |
| 5 | 1.0 | Di- | 0.1 | 0.11 | 1.0 | 1.0 | 9 |
| 6 | 2.0 | Di- | 0.1 | 0.018 | 0.95 | 0.5 | 2.8 |
| 7 | 0.5 | Di- | 0.2 | 0.07 | 1.0 | 0.95 | 13 |
| 8 | 1.0 | Di- | 0.2 | 0.04 | 1.0 | 1.05 | 26 |
| 9 | 2.0 | Di- | 0.2 | 0.01 | 1.0 | 1.1 | 110 |

[1] $=\frac{\text{Vol. Org.}}{\text{Vol. Aq.}}$

As may be noted therefrom, the di-O. P. A. extracts little iron while the uranium extraction is high. There- O. P. A. in isopropyl ether, at a phase ratio of 2:1, aqueous to organic, separation occurred in 10 minutes instead of hours. Separation with kerosene was improved but still remained a matter of hours; however, addition of a small amount of kerosene assisted somewhat. Washing of the kerosene before incorporation into the extractant phase with a quarter volume of conc. $H_2SO_4$ reduced separation time to one hour and washing with a similar amount of 30% NaOH reduced separation time to about 20 minutes.

Other O. P. A. solutions in various organic solvents were tested with the following results:

N-octyl alcohol separated in 5 minutes. Capryl alcohol and n-butyl ether separated in 5 to 7 minutes. Benzene, about 10 minutes, methyl isobutyl ketone, fifteen minutes and certain aliphatic petroleum fractions, boiling in the range of 190–200° C. (Sovasols 5, 6, 80 and 140, produced by the Socony Vacuum Oil Co.) required from 4 to 7 minutes. $CCl_4$ separated rapidly; however, dense ore materials settle therein. General Aromatic Oil No. 1409 (General Petroleum Corp.) did not separate at all and toluene required from 7 to 10 minutes to separate.

Example VII

Extraction data which is of considerable assistance in elucidating and generalizing the behavior of various extractant phase compositions in the slurry systems can be obtained by performing aqueous acidic leaches and contacting the separated leach solution with the extractant phase under varied conditions. Isotherms for the extraction of uranium were determined by such a procedure using normal filtrate of leach slurries prepared as in Example VI.

In order to obtain sufficient latitude in the experimental point at various phase ratios, the following procedure was employed: a 100 ml. portion of the leach filtrate was shaken for 2 minutes with extractant phase, at a phase ratio of 2:1, respectively, the phases separated and the extractant phase contacted, similarly, with two additional successive portions of leach filtrate. The procedure was repeated with phase ratios of 4:1 and 10:1.

Isotherms were determined for 10% O. P. A. in isopropyl ether using such a normal leach filtrate having pH of 0.8; 10% O. P. A. in isopropyl ether and a second filtrate in which the pH had been adjusted to a value of 1.4 with 30% NaOH; and 2.5% O. P. A. in isopropyl ether using a leach filtrate having a pH of 0.8, with the results illustrated in Figure 2 of the drawing.

Isotherms were similarly determined for the distribution of uranium between a 10% O. P. A. solution in Sovasol No. 6 and 10% O. P. A. in toluene using a normal leach filtrate having a pH of 0.8. Results are illustrated in Figure 3 together with comparable values obtained with 10% O. P. A. in isopropyl ether.

Additional isotherms were determined using such a normal leach filtrate and 30% O. P. A. in Sovasol No. 6 as well as 10% O. P. A. in n-heptane with the results presented in Figure 4 of the drawing. The results using 30% O. P. A. indicate very favorable extraction while those of the 10% O. P. A. in n-heptane are very similar to those obtained with Sovasol No. 6.

Isotherms were similarly determined using 10% O. P. A. in kerosene and in Sovasol No. 3, a high boiling aliphatic petroleum fraction and such a normal leach solution having a pH of 0.8, with the results appearing in Figure 5.

Example VIII

Extensive study of various variables influencing phase separation was undertaken using the following methods:

*Experimental method.*—In order to study this problem, at least semi-quantitatively, three different vessels were used for the experiments. The first was a delivery burette, 46 mm. inside diameter and about seven inches long, with a hemispherical bottom, tapering into a stopcock. Agitation was accomplished by means of small motor-driven glass or steel propellers, which could be inserted into the curved portions of the tube. The procedure for cell experiments was as follows: Ore was leached in a separate vessel, at the desired time, 100 ml. of slurry were transferred to the reactor, and mixed for two minutes with 20 ml. of organic solution, after which a twenty-minute separation time was allowed, under controlled conditions. Two or three 25 ml. portions of slurry were drained off, filtered, washed, and analyzed for $U_3O_8$.

*Preparation of the leach slurry.*—Usually leaching was carried out at 19% solids with an initial 280 pounds $H_2SO_4$ per ton ore. The pH was, however, adjusted to 0.8 with more $H_2SO_4$ before each phase separation experiment. In the first experiment leaching was carried on for one hour at 33% solids and the slurry was then diluted to 19% solids. Stirring was continued for several hours. Portions of the slurry were removed immediately after dilution and again after one, and after four and one-half hours from the time of dilution. A 10% solution of commercial O. P. A. in Sovasol No. 6 was used as the organic phase. Phase separation in each case was carried out by rotating the stirrer at about 200 R. P. M. as near the bottom of the vessel as possible, in the aqueous phase. The data for this series of runs are shown in Table I. The percentage uranium holdup was calculated on the basis of a total of about 75 mg. $U_3O_8$ in 100 ml. of slurry. On the basis of experiments done simultaneously in the absence of organic phase, the residue contained 0.003% insoluble $U_3O_8$ and about 0.1% insoluble $PO_4$. It has been decided that the most significant comparison in these experiments is of the $U_3O_8$ distribution figures. Residue analyses can hardly be used, since the solids are not uniformly distributed in the aqueous phase. It is assumed, however, since the slime portion is fairly well distributed with even low degrees of agitation, that the entrained organic phase probably is also.

On this basis, it is seen that the entrained uranium was substantially higher in the first run, while the second and third runs gave values not far apart. Along with each experiment, a portion of the slurry was filtered without contact with the organic phase. The residual or "insoluble" $U_3O_8$ was found to be 0.003% in each of the three runs. The insoluble $PO_4$ was 0.09% at one hour and 0.11% at 2 hours. Filtration of the slurry at one hour was a very slow operation. The rate was much faster after 2 hours and was perhaps even greater after 5½ hours.

The effects observed here may be due to slurry density rather than leach time. Run No. 1 gave the only significantly different result, and since this was performed immediately after dilution of the original slurry, the characteristics observed may be those of a 33% slurry, which has not had sufficient time to change to those of a 19% slurry. Without attempting to distinguish between these two causes at the present time, it was decided to use a 2-hour leach as a standard procedure for purposes of convenience, until the effects of some other variables had been determined.

TABLE I

*Phase separation in aqueous slurry organic leach systems effect of slurry age*

Procedure is described in text. Organic analysis refers to any organic phase found in filtrate. Dilution of original slurry from 33% to 19% solids was made just before first experiment. Residues contain 0.003% insoluble $U_3O_8$, and 0.1% insoluble $PO_4$. Distribution calculations are based on total of 75 mg. $U_3O_8$ in system.

| Leach Time, Hours from Start | 1 | 2 | 5½ |
|---|---|---|---|
| *Aqueous Phase Analyses* | | | |
| Upper Central, 25 ml.: | | | |
| Solid: | | | |
| grams | 1.9 | 1.7 | 3.3 |
| percent $U_3O_8$ | 0.072 | 0.035 | 0.022 |
| mg. $U_3O_8$ | 1.4 | 0.6 | 0.7 |
| percent $PO_4$ | 0.64 | 0.43 | |
| Ratio *$PO_4/U_3O_8$ | 8 | 11 | |
| Organic: mg. $U_3O_8$ | 0.1 | | |
| $U_3O_8$ distribution, as percent in org. and solid | 2.0 | 0.7 | 0.9 |
| Lower Central, 25 ml.: | | | |
| Solid: | | | |
| grams | 2.2 | 1.4 | 4.5 |
| percent $U_3O_8$ | 0.51 | 0.030 | 0.018 |
| mg. $U_3O_8$ | 1.1 | 0.4 | 0.8 |
| percent $PO_4$ | 0.47 | 0.40 | |
| Ratio *$PO_4/U_3O_8$ | 8 | 11 | |
| Organic: mg. $U_3O_8$ | 0.2 | 0.1 | |
| $U_3O_8$ distribution, as percent in org. and solid | 1.7 | 0.7 | 1.1 |
| Bottom, 25 ml.: | | | |
| Solid: | | | |
| grams | 6.5 | 6.5 | 13.4 |
| percent $U_3O_8$ | 0.026 | 0.008 | 0.005 |
| mg. $U_3O_8$ | 1.7 | 0.5 | 0.7 |
| percent $PO_4$ | 0.25 | 0.21 | |
| Radio *$PO_4/U_3O_8$ | 6 | 24 | |
| Organic: mg. $U_3O_8$ | | | |
| $U_3O_8$ distribution, as percent in org. and solid | 2.3 | 0.8 | 0.9 |
| $U_3O_8$ in all 3 Fractions, as percent | 6.0 | 2.2 | 2.9 |

*Calculations based on $U_3O_8$ and $PO_4$ found, minus the "insoluble" $U_3O_8$ and $PO_4$.

Also shown in the table are phosphate analyses of the residues. Since simple acid leaching apparently leaves substantial amounts of phosphate in the residue, the above figures were corrected for the "insoluble" phosphate and divided by the uranium content, values of which fall mainly between 8 and 11, and are in fairly good agreement with the expected ratio in the organic phase. Under the conditions of these experiments, the latter figure will be about 11. This tends to support the assumption that simple entrainment is the cause of the loss of $U_3O_8$ and $PO_4$ to the residue, although it should be pointed out that the correction for "insoluble" $PO_4$ may be subject to considerable variation, depending upon the proportion of sand and slime in the sample.

*Variation of solvent.*—In another set of experiments, a number of different organic solvents were used. In order to insure uniformity of slurries, each 100 ml. portion was made up separately by leaching 22 grams of ore with 93 ml. of dilute $H_2SO_4$ for 2 hours, meanwhile maintaining the pH at 0.8. Phase separation was accomplished as before, the stirrer speed being about 250 R. P. M. to 300 R. P. M. in each case. This was sufficient to maintain a zone of agitation consisting of about the lower two-thirds of the aqueous phase. Two 25 ml. portions of slurry were removed for analysis after 20 minutes. Data for this set of runs are shown in Table II. In regard to the entrainment, the differences are not large. The lowest observed entrainment was in kerosene, while the highest was in toluene. Entrainments in the other solvents were about the same and were intermediate in value. The aqueous filtrate analyses are also included in this table. The analysis was made for the filtrate plus the washings, and has been corrected to the original slurry volume. About the only noticeable feature of these figures is that extractions into ether are poorer than into the other solvents.

TABLE II

*Phase separation in aqueous slurry: organic solution systems. Effect of solvent type*

Procedure described in text. Organic analyses refer to organic phase found in filtrate. $U_3O_8$ distribution calculations based on total of 75 mg. $U_3O_8$ in system. All organic solutions are 10% in commercial O. P. A.

| Solvent | Sovasol* No. 6 | Sovasol* No. 3 | Kerosene | Toluene | Heptane | Isopropyl Ether |
|---|---|---|---|---|---|---|
| *Aqueous Phase Analyses* | | | | | | |
| Lower Central, 25 ml.: | | | | | | |
| Solid: | | | | | | |
| grams | 2.8 | 6.9 | 7.0 | 5.2 | 7.5 | 6.7 |
| Percent $U_3O_8$ | 0.035 | 0.017 | 0.013 | 0.027 | 0.014 | 0.017 |
| mg. $U_3O_8$ | 1.0 | 1.2 | 0.9 | 2.7 | 1.1 | 1.1 |
| Organic: mg. $U_3O_8$ | 0.1 | | | | | |
| Aqueous: grams $U_3O_8$/liter | | 0.009 | 0.008 | 0.013 | 0.009 | 0.061 |
| $U_3O_8$ distribution, as percent in org. and solid | 1.5 | 1.6 | 1.2 | 3.6 | 1.5 | 1.5 |
| Bottom, 25 ml.: | | | | | | |
| Solid: | | | | | | |
| grams | 13.2 | 8.5 | 8.3 | 9.9 | 8.2 | 8.6 |
| Percent $U_3O_8$ | 0.011 | 0.022 | 0.009 | 0.019 | 0.014 | 0.013 |
| mg. $U_3O_8$ | 1.5 | 1.9 | 0.7 | 1.9 | 1.1 | 1.1 |
| Organic: mg. $U_3O_8$ | | | | | | |
| Aqueous: grams $U_3O_8$ | 0.008 | 0.013 | 0.022 | 0.013 | 0.007 | 0.057 |
| $U_3O_8$ distribution, as percent in org. and solid | 2.0 | 2.5 | 0.9 | 2.5 | 1.5 | 1.5 |
| Total $U_3O_8$ in Both Fractions, as percent | 3.5 | 4.1 | 2.1 | 6.1 | 3.0 | 3.0 |

*Boiling range of No. 3 is about 100° C.; that of No. 6 is about 200° to 230° C.

*Effect of separator design and operation.*—After the experiments described above had been performed, it was felt that some modifications in the manner of operation of the equipment should be attempted. Using the same vessel, a different propeller blade was used, one which forced the slurry upward instead of downward. In addition, an increased degree of agitation during phase separation was used in another experiment. The degree of agitation was measured by observing the height of the zone of stirred aqueous phase. Actually, this is somewhat variable and the figures given are averages. Another similar series of experiments were performed with a different vessel. It appeared that in previous experiments some of the sands fell below the stirrer blade and remained in the cone of the vessel. It seemed possible that this unagitated portion might trap organic liquid within it, and thus contribute to higher entrainment losses. The new vessel was accordingly designed with a flat bottom and a horizontal drain at one edge. A small amount of solid settles into this drain, but is removed and discarded prior to sampling. Data obtained in these experiments are recorded in Table III. Using the round bottomed column, no very large difference in behavior is observed. With the flat bottomed column, the only deviation in entrained $U_3O_8$ occurred when the agitation was decreased to a low value. Entrainment losses in the latter vessel were, however, generally the lower of the two.

TABLE III

*Phase separation in aqueous slurry: organic solution systems. Effect of separation operation*

Procedure described in text. Organic analysis refers to organic found in filtrate. $U_3O_8$ distribution calculations based on total 75 mg. $U_3O_8$ in system. Stirrer motion refers to direction in which slurry is forced by the blade.

| Vessel Type | Hemispherical Bottom | | | Flat Bottom | | | |
|---|---|---|---|---|---|---|---|
| Stirrer Motion | Up | Up | Down | Down | Up | Up | Up |
| Zone of Agitation, Fraction of Aq. Phase | 0.5 | 1 | 0.5 | 0.7 | 0.2 | 0.7 | 0.9 |
| *Aq. Phase Analyses* | | | | | | | |
| Lower Central, 25 ml.: | | | | | | | |
| Solid: | | | | | | | |
| Grams | 3.3 | 2.2 | 2.8 | 4.6 | 1.3 | 4.7 | 3.3 |
| Percent $U_3O_8$ | 0.033 | 0.029 | 0.035 | 0.030 | 0.08 | 0.016 | 0.023 |
| mg. $U_3O_8$ | 1.2 | 0.6 | 1.0 | 1.4 | 1.0 | 0.8 | 0.8 |
| Organic: mg. $U_3O_8$ | 0.8 | | 0.1 | | 0.4 | | |
| $U_3O_8$ Distribution, as percent in org. and solid | 2.7 | 0.8 | 1.5 | 1.8 | 1.8 | 1.1 | 1.1 |
| Bottom 25, ml.: | | | | | | | |
| Solid: | | | | | | | |
| grams | 13.0 | 15.8 | 13.2 | 4.5 | 10.1 | 8.6 | 10.9 |
| Percent $U_3O_8$ | 0.009 | 0.011 | 0.011 | 0.013 | 0.017 | 0.011 | 0.012 |
| mg. $U_3O_8$ | 1.2 | 1.7 | 1.5 | 0.6 | 1.7 | 0.9 | 1.3 |
| Organic: mg. $U_3O_8$ | | | | | | | |
| $U_3O_8$ Distribution, as percent in org. and solid | 1.6 | 2.3 | 2.0 | 0.8 | 2.3 | 1.2 | 1.7 |
| Total $U_3O_8$ in both portions, as percent | 4.3 | 3.1 | 3.5 | 2.6 | 4.1 | 2.3 | 2.8 |

A modification of the flat bottomed vessel was made, in which the bottom was a medium porosity glass frit. Phase separation was carried out as before, but in the presence of a stream of air bubbled through the frit. The data are presented in Table IV. In the first experiment, the time interval was inadvertently made too long. It is doubtful, however, whether this was the reason for the difference between the results of experiments 1 and 2; more than likely this difference is the result of variations in the air flow or other variables. In the third experiment, the agitation was decreased as far as possible. If the stirrer is slowed down further, too much sand piles up on the frit and good distribution of the air into the system cannot be made. The really significant point here is that the entrainment losses are about half of any of those in the preceding experiments. The upward movement of the bubbles undoubtedly contributes toward this, perhaps in a manner similar to a flotation system, i. e., becoming attached to the organic phase and carrying it upward. An additional observation, which was made, is that the movement of air, through the organic phase, tends to agitate it sufficiently to coalesce the individual droplets. This could probably be done as easily with another blade on the stirrer shaft.

TABLE IV

*Phase separation in aqueous slurry:organic solution systems. Separation by air bubbling*

Procedure described in text. Air bubbled through bottom frit, while aqueous phase agitated to extent shown. $U_3O_8$ distribution calculations based on total of 75 mg. $U_3O_8$ in system.

| Fraction of Aq. Phase in Zone of Agitation | [1] 0.7 | 0.7 | 0.2 |
|---|---|---|---|
| *Aqueous Phase Analyses* | | | |
| Lower Central, 25 ml.: | | | |
| Solid: | | | |
| grams | 2.4 | 4.3 | 2.4 |
| Percent $U_3O_8$ | 0.014 | 0.009 | 0.014 |
| mg. $U_3O_8$ | 0.3 | 0.4 | 0.3 |
| $U_3O_8$ distribution, as percent in solid | 0.4 | 0.5 | 0.4 |
| Bottom, 25 ml.: | | | |
| Solid: | | | |
| grams | 3.6 | 10.8 | 5.1 |
| Percent $U_3O_8$ | 0.015 | 0.008 | 0.009 |
| mg. $U_3O_8$ | 0.5 | 0.9 | 0.5 |
| $U_3O_8$ distribution, as percent in solid | 0.7 | 1.2 | 0.7 |
| Total $U_3O_8$ in the two fractions, percent of total | 1.1 | 1.7 | 1.1 |

[1] Phases separated for about 25 minutes instead of 20, as in the other two experiments.

*Example IX*

Two experiments were performed to determine the possibility of reducing organic entrainment in the slurry extraction by the method of phase inversion. In theory, by dispersing the aqueous phase in the organic, the problem becomes one of entrainment of aqueous in the organic, allowing the slurry to be discarded without loss of the valuable organic phase. The slurry used in these experiments was prepared by curing Lukachukai ore with 500 lbs. $H_2SO_4$/ton for 16 hours at 110° C. and leaching with water for about 15 minutes at 20% solids (ore). The slime was decanted, the pH was adjusted to 1.5, and the slurry reduced with $Na_2S_2O_4$, until a negative KSCN test for $Fe^{+++}$ was obtained.

In one experiment 100 ml. of slurry and 20 ml. of 0.35 M di-O. P. A. in kerosene were stirred vigorously for 2 minutes in a 1¼" I. D. cylindrical column, and the phases were allowed to separate under the influence of gentle agitation for 20 minutes. A 75 ml. portion of slurry was drawn off and observed to contain considerable entrained organic phase, at least several tenths of an ml. This mixture was allowed to run through a pipette tip into a 5" deep and 1¼" diameter column of fresh 0.35 M di-O. P. A. in kerosene. Two 25 ml. portions of the lower aqueous phase were clear and contained no organic phase at their surfaces. The solids were analyzed for total $PO_4$ as a means of determining entrainment. In the first and second 25 ml. portions of slurry 4 mg. and 1.2 mg. respectively, of $PO_4$ were found representing about 0.6% and 0.2%, respectively, of the organic phase. Extrapolating to the original aqueous volume, these figures correspond to losses of 2.4% and 0.8% respectively, of the organic phase.

In another experiment 80 ml. of 0.35 M di-O. P. A. were stirred with 40 ml. of slurry, under the same conditions as the first experiment. After a 20 minute phase separation period 25 ml. of slurry were withdrawn and filtered. Again the aqueous was clear and contained no organic phase. The solid contained 1 mg. $PO_4$, corresponding to a loss of about 0.15% of the organic phase in this sample, or about 0.6% in the total aqueous phase.

Actually, these figures give only upper limits to the entrainment, since only phosphate remaining in the ore after leaching will be charged to entrainment. Actual losses of organic phase are probably smaller, but in any event are not unreasonably high.

*Example X*

An extraction column was constructed to contact di-O. P. A. in kerosene with an aqueous slurry continuously. This was done to give some idea of the entrainment that might be expected in this type of operation. The column consisted of a 2.75" diameter glass tube, 12 inches in length, with a conical bottom and a tube for the removal of the slurry at the bottom. It contained one mixing stage, which was separated from the calming sections by two Lucite plates 2.5 inches apart, each of which had a 1.4 inch hole in the center.

A 1.4 inch diameter propeller was used to disperse the phases. A side tube near the bottom was used to pump the O. P. A. into the column just above the interface, and the organic phase was removed near the top of the column through another tube. The aqueous slurry was introduced at the top to give countercurrent operation.

The aqueous slurry was prepared by adding to Lukachukai ore an amount of concentrated $H_2SO_4$ equivalent to 500 lbs. per ton of ore. This was mixed thoroughly with the ore and the damp ore was allowed to stand overnight in an oven at 110° C. The cured ore was then mixed with its original dry weight of water and the slurry mixed thoroughly. The sands were allowed to settle for about five minutes and the slurry containing the fines decanted. This procedure was repeated 3 times and the 4 portions of the decanted slurry were mixed.

The di-O. P. A. for these experiments was obtained by contacting a 25% solution of Victor O. P. A. in kerosene with ethylene glycol at a 1-to-1 phase ratio in a three stage countercurrent mixer-settler to selectively extract the mono-O. P. A. In a fourth stage, the kerosene phase containing the di-O. P. A. was washed with 4N $H_2SO_4$ to remove any entrained glycol. The material remaining in the kerosene appeared to be at least 99% pure di-O. P. A. and had a concentration of 0.38 M.

In the slurry extraction procedure, the flow rates of the slurry and 0.38 M di-O. P. A., although slightly variable, were kept at approximately a 10-to-1 ratio. The organic was the continuous phase throughout the runs. The slurry was stirred continually in the feed container during the run to prevent the solids from settling. The aqueous slurry was pumped into the top of the column and removed from the bottom continuously. The 0.38 M di-O. P. A. in kerosene was pumped into the bottom of the column just above the interface of the two phases and also removed continuously at the top of the column.

The data obtained on the loss of di-O. P. A. are shown in the table. Since it is known that the distribution of di-O. P. A. into aqueous media is very slight, the O. P. A. loss was determined by equilibrating 100 ml. portions of the effluent slurry with 25 ml. of kerosene. The distribution coefficient for di-O. P. A. between aqueous solutions and kerosene is so greatly in favor of the kerosene that this method should extract all the entrained and nearly all of the solubilized di-O. P. A. from the slurry. The kerosene phase was then analyzed for phosphate.

[Loss of di-O.P.A. to aqueous slurry in continuous operation. Organic 0.38 M di-O.P.A. in kerosene (122.4 g./l.)]

| Aqueous, ml./min. | Organic, ml./min. | g./l. Di-O.P.A. in Kerosene | g./l. Di-O.P.A. in Slurry | Percent of Di-O.P.A. Lost to Aqueous |
|---|---|---|---|---|
| 86 | 8.6 | 0.061 | 0.015 | 0.12 |
| 86 | 8.6 | 0.047 | 0.012 | 0.10 |
| 86 | 8.6 | 0.047 | 0.012 | 0.10 |
| 58 | 5.6 | 0.000 | 0.000 | 0.00 |
| 58 | 5.6 | 0.13 | 0.003 | 0.02 |
| Sample from feed solution | | 0.000 | 0.000 | 0.00 |

It can be seen from the data that the loss of di-O. P. A. is very small.

Since considerable time and amounts of solution are required for this system to come to equilibrium with regard to the extractions of uranium and vanadium, the extraction data are, therefore, not representative of the better results to be obtained in large scale operation. The best extraction of uranium obtained in this small scale experiment was 73%, a value which should be raised to essentially complete recovery in practical large-scale operation.

*Example XI*

Uranium was recovered from roasted uraniferous Chattanooga shale which occurs in large deposits in the Southern United States. Pulverized material was leached for two hours with 20 ml. of water per gram of shale, the solids filtered and the wet residue shaken for two hours with 4 ml. of 2% O. P. P. A. in diluent per gram of shale. Only a small amount of uranium was leached by the water but essentially all of the uranium was recovered by the extractant phase.

*Example XII*

A slurry of phosphatic ore, i. e., phosphate rock acidulated with nitric acid yielding an acidic aqueous slurry thereof was contacted with kerosene solutions of various extractants to obtain distribution isotherms. There were employed extractant phases containing 1.2 M (50%) octyl pyrophosphoric acid, 1.0 M dodecyl pyrophosphoric (DDPPA) acid and, for comparison, tributyl phosphate, at various phase ratios. The latter extractant proved to be totally ineffective. Results are presented in Figure 6 of the drawing. As may be seen therefrom, the DDPPA solution and a $K_D$ distribution coefficient of about 3.4 and the O. P. P. A. solution a $K_D$ value of about 2.3, which values indicate feasible recoveries particularly if the uranium content is above the value shown, or multistage operation is employed.

While in the foregoing there has been described what may be considered to be preferred embodiments of the invention modification within the skill of the art may be made therein and it is intended to cover all such as fall within the scope of the appended claims.

What is claimed is:

1. In a slurry solvent extraction process for recovering an actinide metal value from solid material, the steps comprising contacting an organic phosphatic extractant phase with an aqueous slurried admixture of said solid material, whereby said metal values are leached into the aqueous phase of the slurried admixture forming ions which thenceforth are extracted into said extractant phase.

2. In a slurry solvent extraction process for recovering an actinide metal value from a solid material, the steps comprising contacting the solid material slurried in a finely divided state in an aqueous phase with an organic extractant phase including a material selected from the group consisting of alkyl phosphoric acids, alkyl pyrophosphoric acids, alkyl phosphites and alkyl phosphonates dissolved in an organic diluent, whereby said metal value is leached into said aqueous phase forming ions which thenceforth are extracted into said extractant phase, 3. In a slurry solvent extraction process for recovering an actinide metal value from a solid material, the steps comprising contacting the solid material slurried in a finely divided state in an aqueous phase with an extractant phase including a material selected from the group consisting of alkyl phosphoric acids, alkyl pyrophosphoric acids, alkyl phosphites and alkyl phosphonates dissolved in an organic diluent, whereby said metal value is leached into said aqueous phase forming ions which thenceforth are extracted into the extractant phase, separating the extractant phase from the slurry, and recovering the metal value from the extractant phase.

4. In a slurry solvent extraction process for recovering an actinide metal value from a solid material, the steps comprising reducing the solid material to a finely divided state, then contacting the solid material simultaneously with aqueous mineral acid and an extractant phase including a material selected from a group consisting of alkyl phosphoric acids, alkyl pyrophosphoric acids, alkyl phosphites and alkyl phosphonates dissolved in an organic diluent forming an aqueous slurried mixture, whereby said metal value is leached into the aqueous phase of said slurried mixture forming ions which thenceforth are extracted into the extractant phase, separating the extractant phase from the slurry, and recovering the metal value from the extractant phase.

5. The process as defined in claim 4 wherein said aqueous mineral acid comprises $H_2SO_4$.

6. The process as defined in claim 4 wherein said aqueous mineral acid comprises HCl.

7. The process as defined in claim 4 wherein said aqueous mineral acid comprises $HNO_3$.

8. In a slurry solvent extraction process for recovering an actinide metal value from a solid material, the steps comprising reducing the solid material to a finely divided state, contacting the solid material with an extractant phase including a material selected from a group consisting of alkyl phosphoric acids, alkyl pyrophosphoric acids, alkyl phosphites and alkyl phosphonates dissolved in an organic diluent forming a mixture, adding aqueous mineral acid shortly thereafter to form an aqueous slurried admixture, whereby said metal value is leached into the aqueous phase of said slurried mixture forming ions which thenceforth are extracted into the extractant phase, separating the extractant phase from the slurry, and recovering the metal value from the extractant phase.

9. In a slurry solvent extraction process for recovering uranium values from an ore, the steps comprising pulverizing the ore, adding and mixing aqueous mineral acid with the ore to form an aqueous acidic slurry therewith, then contacting the slurry with an extractant phase including a material selected from the group consisting of alkyl phosphoric acids, alkyl pyrophosphoric acids, alkyl phosphites and alkyl phosphonates dissolved in an organic diluent, whereby said uranium values are leached into the aqueous phase of said slurry forming ions which thenceforth are extracted into the extractant phase separating the extractant phase from the slurry, and recovering the uranium values from the extractant phase.

10. The process as described in claim 4 but wherein said organic diluent comprises a material selected from the group consisting of ethers, ketones, higher alcohols, petroleum hydrocarbons and aliphatic hydrocarbons.

11. The process as described in claim 8 but wherein said organic diluent comprises a material selected from the group consisting of ethers, ketones, higher alcohols, petroleum hydrocarbons and aliphatic hydrocarbons.

12. The process as otherwise described in claim 9 but wherein said mineral acid comprises a material selected from the group consisting of $H_2SO_4$, HCl and $HNO_3$ and said organic diluent comprises a material selected from the group consisting of ethers, ketones, higher alcohols, petroleum hydrocarbons and aliphatic hydrocarbons.

13. In a slurry solvent extraction process for recovering uranium values from a carnotite ore the steps consisting of pulverizing the ore, mixing an extractant phase including an alkyl phosphatic extractant and an organic diluent to form a mixture therewith, adding aqueous mineral acid selected from the group consisting of $H_2SO_4$, HCl and $HNO_3$ to the slurry, whereby the uranium values are leached into the aqueous mineral acid phase forming ions which thenceforth are extracted by the extractant phase, separating the extractant phase from the slurry, and recovering the uranium from the extractant phase.

14. In a slurry solvent extraction process for recovering uranium values from a carnotite ore, the steps comprising pulverizing the ore, adding an extractant phase including an alkyl phosphatic extractant and an organic diluent to the pulverized ore to form a slurry, adding aqueous $H_2SO_4$ to the slurry, whereby the uranium values are leached into the acidic aqueous phase of the slurry forming ions which thenceforth are extracted by the extractant phase, separating the extractant phase from the slurry, and recovering the uranium values from the extractant phase.

15. In a slurry solvent extraction process for recovering uranium values from a carnotite ore, the steps comprising contacting said ore in a finely divided state with an extractant phase including an alkyl phosphatic extractant dissolved in an organic diluent and forming a slurry in the presence of an aqueous mineral acid phase, whereby the uranium values are leached into the acidic aqueous phase of the slurry forming ions which thenceforth are extracted by the extractant phase, separating the extractant phase from the slurry, treating the extractant phase with dilute aqueous HF in the presence of a reducing agent to precipitate uranium fluoride therefrom, and separating the precipitate from the extractant phase.

16. In a slurry solvent extraction process for recovering uranium values from a carnotite ore, the steps comprising contacting said ore in a finely divided state with an extractant phase including an alkyl phosphatic extractant dissolved in an organic diluent, forming a slurried mixture in the presence of an aqueous mineral acid phase, whereby the uranium values are leached into the acidic aqueous phase of the slurry forming ions which thenceforth are extracted by the extractant phase, treating the extractant phase with a basic material to precipitate the uranium values therefrom, and separating the precipitated uranium from the extractant phase.

17. In a slurry solvent extraction process for recovering uranium values from a carnotite ore, the steps comprising contacting said ore in a finely divided state with an extractant phase including an alkyl phosphatic extractant dissolved in an organic diluent forming a slurried mixture in the presence of an aqueous mineral acid phase, whereby the uranium values are leached into the acidic aqueous phase of the slurry forming ions which thenceforth are extracted by the extractant phase, contacting the extractant phase with an aqueous stripping solution, whereby the uranium is extracted in said aqueous solution, separating the aqueous stripping solution and extractant phases, and drying and calcining the aqueous phase to yield uranium oxide.

18. In a slurry solvent extraction process for recovering uranium values from a carnotite ore, the steps comprising contacting said ore in a finely divided state with an extractant phase including an alkyl phosphatic extractant dissolved in an organic diluent forming a slurried mixture in the presence of an aqueous mineral acid phase, whereby the uranium values are leached into the acidic aqueous phase of the slurry forming ions which thenceforth are extracted by the extractant phase, contacting the extractant phase with an aqueous solution of oxalic acid, whereby the uranium is extracted into said aqueous solution, separating the aqueous solution and extractant phases, and precipitating uranium from the aqueous oxalic acid phase.

19. In a slurry solvent extraction process for recovering uranium values from a carnotite ore, the steps comprising contacting said ore in a finely divided state with an extractant phase including an alkyl phosphatic extractant dissolved in an organic diluent forming a slurried mixture in the presence of an aqueous mineral acid phase, whereby the uranium values are leached into the acidic aqueous phase of the slurry forming ions which thenceforth are extracted by the extractant phase, contacting the extractant phase with an aqueous solution of HF of about 3 to 5% concentration, whereby the uranium is extracted into said aqueous solution, separating the aqueous solution and extractant phases, and treating the aqueous phase with a reducing agent to precipitate uranous fluoride therefrom.

20. In a slurry solvent extraction process for recovering uranium values from a carnotite ore, the steps comprising contacting said ore in a finely divided state with an extractant phase including an alkyl phosphatic extractant dissolved in an organic diluent forming a slurried slurry in the presence of an aqueous mineral acid phase, whereby the uranium values are leached into the acidic aqueous phase of the slurry forming ions which thenceforth are extracted by the extractant phase, contacting the extractant phase with an aqueous solution of pyrophosphates acidified to a pH below about 3, whereby the uranium is extracted into said aqueous solution, separating the aqueous solution and extractant phases, and neutralizing the aqueous phase in the presence of sodium bisulfite to precipitate the uranium therefrom.

21. In a slurry solvent extraction process for recovering uranium values from a carnotite ore, the steps comprising contacting said ore in a finely divided state with an extractant phase including an alkyl phosphatic extractant dissolved in an organic diluent and forming a slurry in the presence of an aqueous mineral acid phase, whereby the uranium values are leached into the acidic aqueous phase of said slurry forming ions which thenceforth are extracted by the extractant phase, separating the extractant phase from the slurry, adding alcohol selected from the group consisting of methyl and ethyl alcohols to the extractant phase to precipitate the uranium, and separating the precipitate from the fluid phases.

22. In a slurry solvent extraction process for recovering uranium values from a carnotite ore, the steps comprising contacting said ore in a finely divided state with an extractant phase including an alkyl phosphatic extractant dissolved in an organic diluent and forming a slurry in the presence of an aqueous mineral acid phase, whereby the uranium values are leached into the acidic aqueous phase of said slurry forming ions which thenceforth are extracted into the extractant phase, separating the extractant phase from the slurry, contacting the extractant phase with HCl of above about 11 M concentration to extract the uranium therein, and recovering the uranium from the HCl phase.

23. In a slurry solvent extraction process for recovering uranium values from a carnotite ore, the steps comprising contacting said ore in a finely divided state with an extractant phase including an alkyl phosphatic extractant dissolved in an organic diluent and forming a slurry in the presence of an aqueous mineral acid phase, whereby the uranium values are leached into the acidic aqueous phase of said slurry forming ions which thenceforth are extracted by the extractant phase, separating the extractant phase from the slurry, contacting the extractant phase with HCl of above about 11 M concentration to extract the uranium therein, contacting the HCl phase with a strongly basic anionic exchange resin to adsorb the uranium thereon, eluting the uranium from the resin with water, and recovering the uranium from the eluate obtained in the foregoing operation.

24. In a slurry solvent extraction process for recovering uranium values from a carnotite ore, the steps comprising contacting said ore in a finely divided state with an extractant phase including an alkyl phosphatic extractant dissolved in an organic diluent and forming a slurry in the presence of an aqueous mineral acid phase, whereby the uranium values are leached into the acidic aqueous phase of said slurry forming ions which thenceforth are extracted by the extractant phase, separating the extractant phase from the slurry, contacting the extractant phase with HCl of above about 11 M concentration to extract the uranium therein, and distilling the HCl from the HCl to leave the uranium as a residue.

25. In a slurry solvent extraction process for recovering uranium values from a carnotite ore, the steps comprising contacting said ore in a finely divided state with an extractant phase including an alkyl phosphatic extractant dissolved in an organic diluent and forming a slurry in the presence of an aqueous mineral acid phase, whereby the uranium values are leached into the acidic aqueous phase of said slurry forming ions which thenceforth are extracted by the extractant phase, separating the extractant phase from the slurry, contacting the extractant phase with an acidified solution of $Na_4P_2O_7$ to strip the uranium therefrom, and precipitating the uranium from the strip solution by neutralizing with base.

26. In a slurry solvent extraction process for recovering uranium values from a carnotite ore, the steps comprising contacting said ore in a finely divided state with an extractant phase including an alkyl phosphatic extractant dissolved in an organic diluent forming a slurried mixture in the presence of aqueous mineral acid phase, whereby the uranium values are leached by the aqueous phase and then extracted therefrom by the extractant phase, contacting the extractant phase with an aqueous solution of polyphosphate acidified to a pH below about 3, whereby the uranium is extracted into said aqueous solution, separating the aqueous solution and extractant phases, and neutralizing the aqueous phase in the presence of sodium bisulfite to precipitate the uranium therefrom.

27. In a slurry solvent extraction process for recovering uranium values from a carnotite ore, the steps comprising producing a slurry of such ore in a finely divided form with an aqueous mineral acid phase, contacting said aqueous slurry countercurrently with a column of an alkyl phosphatic acid ester extractant in an organic diluent as the continuous phase to extract the uranium therein, whereby essentially no extractant phase is entrained in the aqueous slurry, withdrawing extract produced thereby, and recovering uranium from the extract.

References Cited in the file of this patent

UNITED STATES PATENTS

| | | |
|---|---|---|
| 2,047,989 | Woelflin | July 21, 1936 |
| 2,227,833 | Hixson et al. | Jan. 7, 1941 |
| 2,769,686 | McCullough et al. | Nov. 6, 1956 |
| 2,789,879 | Kaufman | Apr. 23, 1957 |
| 2,780,519 | Kaufman et al. | Feb. 5, 1957 |
| 2,806,764 | Bailes et al. | Sept. 17, 1957 |

OTHER REFERENCES

Bennett: Practical Emulsions, Chemical Publ. Co. (1947), pp. 5, 6, 45, 55, 56.

Sutheim: Introduction to Emulsions, Chemical Publ. Co., N. Y. (1947), pp. 6, 7, 140–142.

Atomic Energy Comm. document DOW–80 July 7, 1952; Document DOW–83 Aug. 6, 1952. (Both available from Atomic Energy Commission.)

Atomic Energy Comm. document ORNL–1500, pp. 115, 122, 123, Mar. 31, 1953.

ISC–612, Atomic Energy Comm. document, June 1955, pp. IV, V, 23, 24.